US009969225B2

(12) United States Patent
Hansen (10) Patent No.: US 9,969,225 B2
(45) Date of Patent: May 15, 2018

(54) AGRICULTURAL MACHINE WITH TIRE INFLATION CONTROL

(71) Applicant: CNH Industrial America LLC, New Holland, PA (US)

(72) Inventor: Bradley Hansen, Montevideo, MN (US)

(73) Assignee: CNH Industrial America LLC, New Holland, PA (US)

( * ) Notice: Subject to any disclaimer, the term of this patent is extended or adjusted under 35 U.S.C. 154(b) by 0 days. days.

(21) Appl. No.: 15/137,817

(22) Filed: Apr. 25, 2016

(65) Prior Publication Data

US 2017/0305211 A1    Oct. 26, 2017

(51) Int. Cl.
*B60C 23/00*    (2006.01)
*A01C 23/00*    (2006.01)
*A01C 23/04*    (2006.01)

(52) U.S. Cl.
CPC .......... *B60C 23/002* (2013.01); *A01C 23/008* (2013.01); *A01C 23/047* (2013.01)

(58) Field of Classification Search
None
See application file for complete search history.

(56) References Cited

U.S. PATENT DOCUMENTS

| 4,570,691 A | 2/1986 | Martus |
| 4,763,709 A * | 8/1988 | Scholer ................ B60C 23/001 |
| | | 141/38 |
| 5,647,927 A | 7/1997 | Mason |
| 6,098,682 A | 8/2000 | Kis |
| 6,144,295 A | 11/2000 | Adams et al. |
| 6,212,464 B1 | 4/2001 | Skotnikov |
| 6,499,343 B1 | 12/2002 | Haas et al. |
| 6,594,566 B1 | 7/2003 | Skoff |
| 6,758,088 B2 | 7/2004 | Claussen et al. |
| 6,892,776 B2 | 5/2005 | Skoff |

(Continued)

FOREIGN PATENT DOCUMENTS

| CN | 101927667 A | 12/2010 |
| DE | 4014379 A1 | 11/1991 |
| EP | 1493599 A2 | 1/2005 |

OTHER PUBLICATIONS

FTL Technology; "Central Tire Inflation"; web-site—http://www.ftl.technology/products/rotary-seals/central-tire-inflation; pp. 1-2; Jul. 2015: US.

*Primary Examiner* — Rodney A Butler
*Assistant Examiner* — Tamara L Weber
(74) *Attorney, Agent, or Firm* — Rebecca L. Henkel; Rickard K. DeMille (57) ABSTRACT

A system for changing pressure in one or more tires of a self-propelled agricultural machine according to a load differential determined using load sensors on opposing locations of the machine. A load differential may be caused by a disproportionate distribution of forces and/or weight on the machine. Load sensors proximal to the tires may allow determining corresponding loads on the tires and, in turn, the load differential. As a result, tires experiencing greater loads may be inflated, whereas tires experiencing lesser loads may be deflated. In addition, a Human Machine Interface (HMI) may be provided in the operator cab to allow an operator to have further control over tire inflation on the fly while operating the machine.

20 Claims, 5 Drawing Sheets

(56) References Cited

U.S. PATENT DOCUMENTS

| | | |
|---|---|---|
| 7,302,837 B2 | 12/2007 | Wendte |
| 8,176,958 B2 | 5/2012 | Rodenbeck |
| 8,843,269 B2 | 9/2014 | Anderson et al. |
| 8,844,596 B2 | 9/2014 | Medley et al. |
| 2005/0087378 A1 | 4/2005 | Hrazdera |
| 2013/0054078 A1* | 2/2013 | Anderson ............. B60C 23/002 701/29.1 |
| 2015/0005982 A1* | 1/2015 | Muthukumar ............ B60T 1/10 701/1 |
| 2015/0202931 A1* | 7/2015 | Honig .................. B60C 23/001 152/416 |
| 2016/0052351 A1* | 2/2016 | Dilisio ................. B60C 23/003 701/36 |
| 2016/0059643 A1* | 3/2016 | Infantini ................ B60C 23/00 152/415 |
| 2017/0027103 A1* | 2/2017 | Grotelueschen ..... A01C 23/008 |

* cited by examiner

AGRICULTURAL MACHINE WITH TIRE INFLATION CONTROL

FIELD OF THE INVENTION

The present invention relates generally to a self-propelled agricultural machine having inflatable tires, and in particular, to self-propelled agricultural machine having load sensors and a tire inflation controller operable to inflate or deflate the inflatable tires according to a load differential determined from the load sensors.

BACKGROUND OF THE INVENTION

Tires on agricultural machines are typically rated for optimal speeds and loads. Generally, the higher the load and/or faster the speed, the higher the air pressure should be in the tires. On the other hand, when field soils are soft and/or wet, tires will carry better, or "float" better, over the ground with lower pressure in the tires. Doing so may advantageously leave less tire "ruts," or depressions or grooves in the soil, as the tires travel over the ground. However, tires on agricultural machines are typically pressurized to a desired level and not changed thereafter, or are changed only under limited circumstances, such, as according to a location of the machine in a field subject to moisture. As a result, there are oftentimes conditions being encountered, such as higher loads and/or faster speeds, in which pressure in the tires is still not optimally provided.

SUMMARY OF THE INVENTION

The present invention provides a system for changing pressure in one or more tires of a self-propelled agricultural machine according to a load differential determined using load sensors on, opposing locations of the machine. A load differential may be caused by a disproportionate distribution of forces and/or eight on the machine. Load sensors proximal to the tires may allow determining corresponding loads on the tires and, in turn, the load differential. As a result, tires experiencing greater loads may be inflated, whereas tires experiencing lesser loads may be deflated. In addition, a Human Machine Interface (HMI) may be provided in the operator cab to allow an operator to have further control over tire inflation on the fly while operating the machine.

In one aspect, a pneumatic system and a monitoring system may be installed on a machine for actively changing and monitoring the air pressure in the vehicles tires based on operator input, vehicle speed, and/or vehicle weight, including payload. Equipment for changing and monitoring tire pressures may consist of an on-board pneumatic system and an on-board monitoring system. The on-board pneumatic system may include, for example, an air compressor, an air tank and multiple air lines. The on-board monitoring system may include, for example, a controller, wires and sensors. Each tire may have an air line routed to the tire that could inflate or deflate the tire. Each tire may also have a pressure sensor for reading tire pressure and sending information to the controller, such as via wiring. The controller may also retrieve data from other sensors on the vehicle, such as sensors indicating weight and/or speed. An operator could use the pneumatic system in order to actively, and quickly, change tire pressure in each of the tires to maximize tire performance based on current conditions. The monitoring system could monitor vehicle weight and speed, take inputs from the operator on soil conditions, and change tire pressures while the vehicle is in operation. As a result, the operator may maximize tire performance in real time, and thereby maximize vehicle performance, based on current operating conditions.

The vehicle or machine may also utilize a tire inflation controller, location sensor and database storing, condition characteristics corresponding to a field, including as described in U.S. Pat. No. 7,302,837, titled "Tire Inflation System for Use with an Agricultural implement," the disclosure of which is incorporated herein by reference in its entirety. The vehicle or machine may also utilize a tire management system, including as described in U.S. Patent Application Publication No. 2016/0059643, titled "Tire Pressure Control System for a Vehicle," the disclosure of which is incorporated herein by reference in its entirety.

Specifically then, in one aspect, a self-propelled agricultural machine may be provided. The self-propelled agricultural machine may include a frame; an operator cab supported by the frame; first and second wheels having first and second inflatable tires mounted thereon, respectively, the first and second inflatable tires being configured to support the frame on opposing locations; a tire inflation controller in communication with the first and second inflatable tires, the tire inflation controller being operable to at least one of inflate and deflate either of the first and second inflatable tires; first and second load sensors located, proximal to the first and second inflatable tires, respectively, the first and second load sensors being configured to sense first and second loads corresponding to the first and second inflatable tires, respectively; and a system controller in communication with the tire inflation controller and the first and second load sensors. The system controller may execute a program stored in a non-transient medium operable to: (a) determine a load differential between the first and second loads corresponding to the first and second inflatable tires provided by the first and second load sensors, respectively; and (b) command the tire inflation controller to at least one of inflate and deflate either of the first and second inflatable tires according to the load differential.

Another aspect may provide a self-propelled agricultural sprayer including: a frame; an operator cab supported by the frame; a pair of wing booms pivotably mounted to the frame, the wing booms being configured to spray an agricultural field; first, second, third and fourth wheels having first, second, third and fourth inflatable tires mounted thereon, respectively, the first and second inflatable tires being configured to support the frame on left and right opposing sides at a front of the frame, respectively, and the third and fourth inflatable tires being configured to support the frame on left and right opposing sides at a back of the frame, respectively; a tire inflation controller in communication with the first, second, third and fourth inflatable tires, the tire inflation controller being operable to at least one of inflate and deflate any of the first, second, third and fourth inflatable tires; first, second, third and fourth load sensors located proximal to the first, second, third and fourth inflatable tires, respectively, the first, second, third and fourth load sensors being configured to sense first, second, third and fourth loads corresponding to the first, second, third and fourth inflatable tires, respectively; and a system controller in communication with the tire inflation controller and the first, second, third and fourth load sensors. The system controller may execute a program stored in a non-transient medium operable to: (a) determine a load differential between one of the first, second, third and fourth loads corresponding to the first, second, third and fourth inflatable tires, respectively, and another of the first, second, third and fourth loads corresponding to the first, second, third and fourth inflatable tires, respectively;

and (b) command the tire inflation controller to at least one of inflate and deflate at least one of the first, second, third and fourth inflatable tires according to the load differential.

Other aspects, objects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout.

DETAILED DESCRIPTION OF THE DRAWINGS

Figure 1:
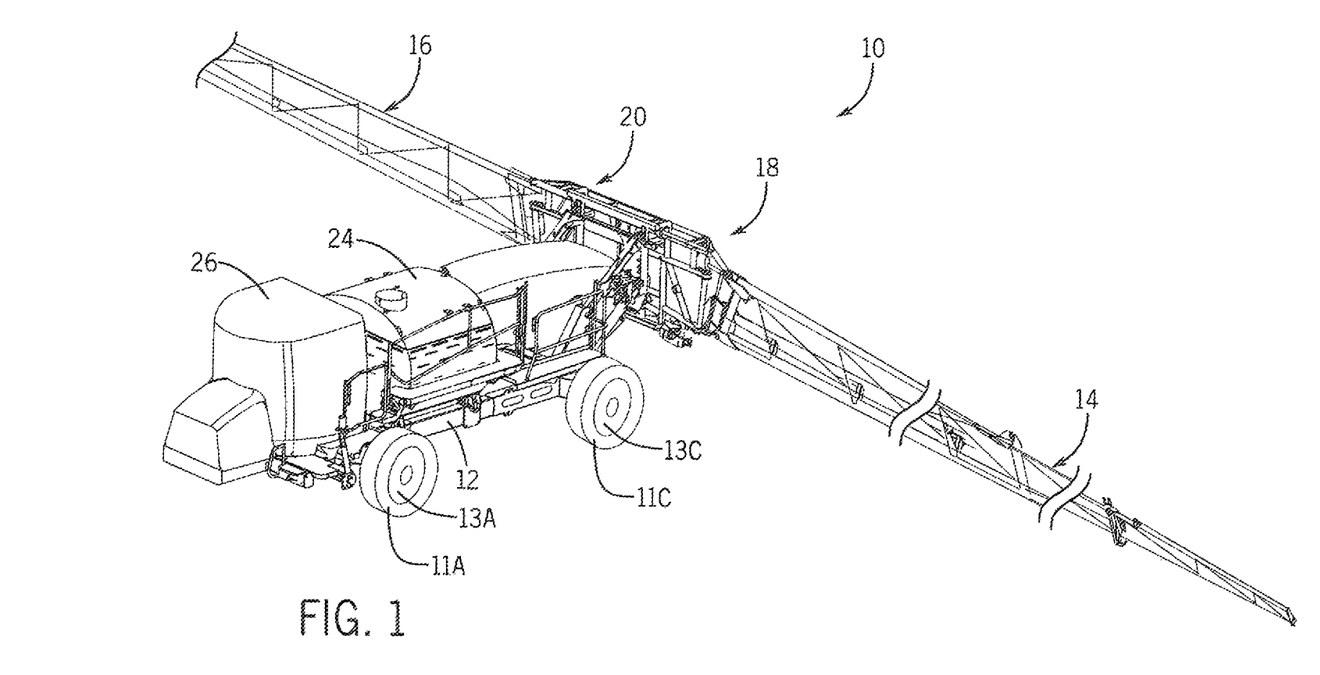
FIG. 1 illustrates an isometric view of a machine for agricultural operations, shown as a self-propelled agricultural sprayer by way of example, having inflatable tires and a tire inflation controller in accordance with an aspect of the present invention.
Figure 2:
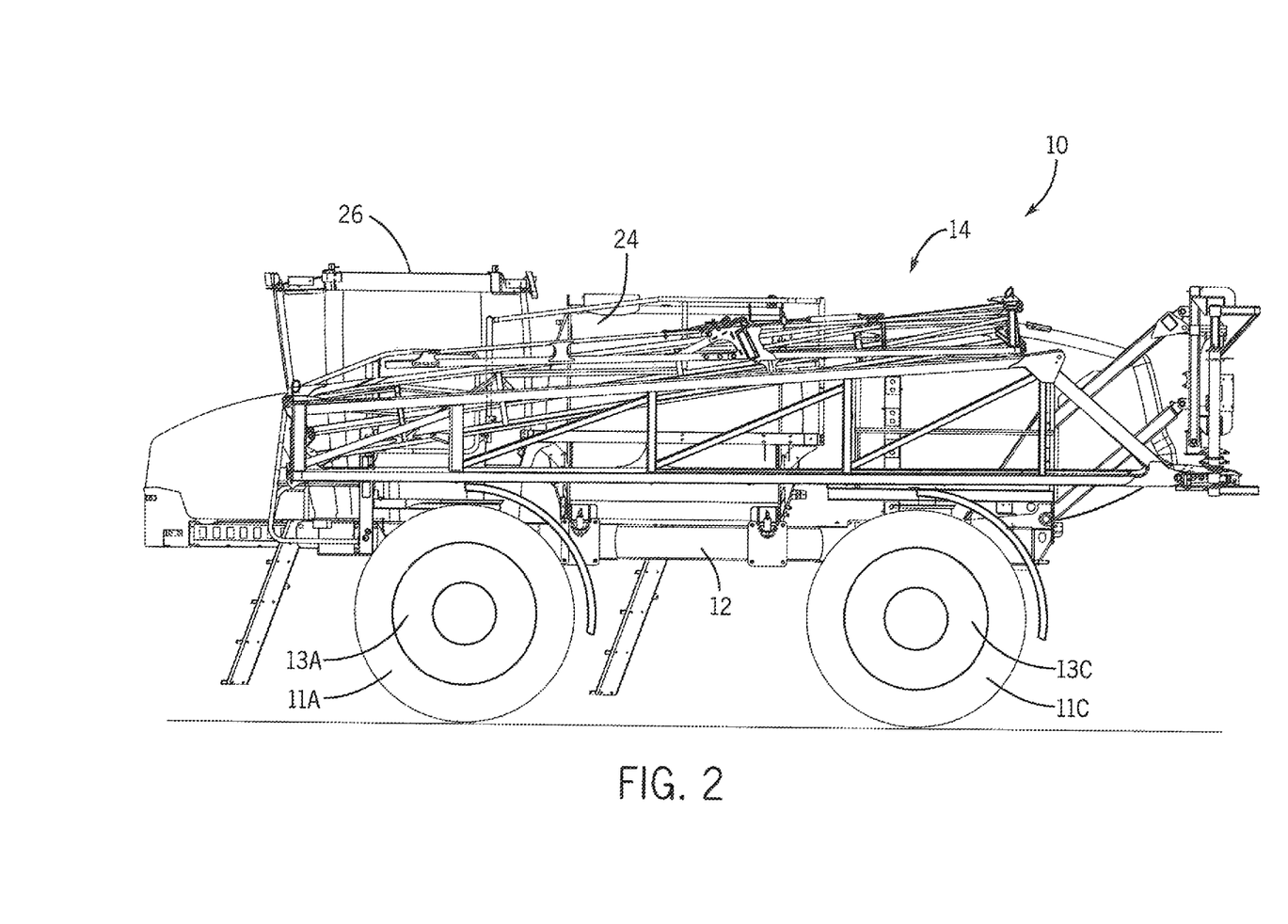
FIG. 2 illustrates a side elevation view of the machine shown in FIG. 1.
Figure 3:
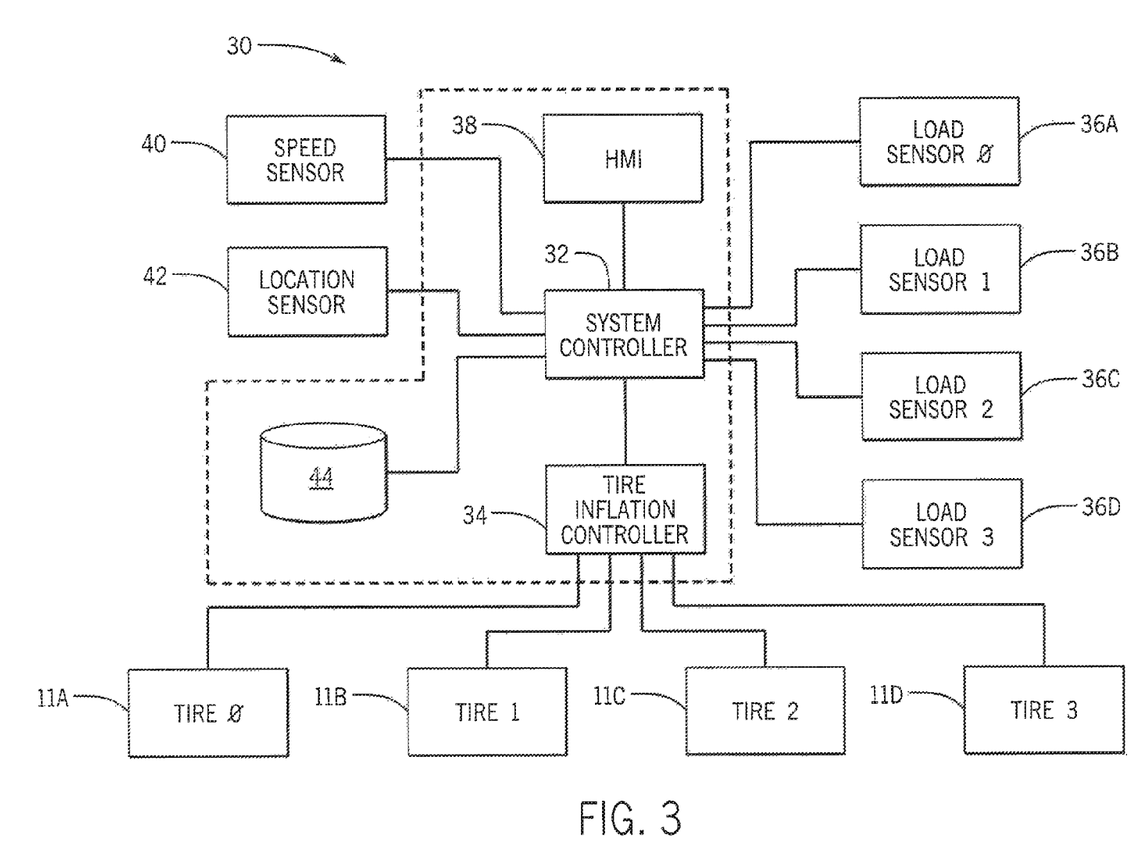
FIG. 3 illustrates a schematic diagram of a tire inflation control system for the agricultural machine of FIGS. 1 and 2.

Referring generally to the drawings, and more particularly to FIGS. 1-3, an exemplar machine 10 for agricultural operations, which in the illustrated embodiment is a self-propelled, agricultural sprayer by way of example, is provided in accordance with an aspect of the present invention. While an agricultural sprayer is shown and substantially described, it is understood that the present invention is not limited to an agricultural sprayer and thus may be applicable with other types of machines or implements.

The machine 10 may include a frame 12 supported by wheels 13 (shown as first second, third, and fourth wheels 13A, 13B, 13C and 13D, respectively) having inflatable tires 11 (shown as first, second, third and fourth inflatable tires 11A, 11B, 11C and 11D, respectively) mounted thereon. Although the machine 10 is shown by way of example as having four wheels, the present invention may be applicable to machines having less than four wheels, such as floaters having three wheels, or machines having more than four wheels.

For spraying operations, a pair of left and right wing booms 14 and 16, respectively, may be connected to the frame 12. The left and right wing booms 14 and 16, respectively, may be designed to fold for toward a leading end of the frame 12 when the wing booms are moved from an extended position, shown in FIG. 1, to a stowed or transport position, shown in FIG. 2 for the left wing boom 14 only. One skilled in the art will appreciate that the right wing boom 16 is stored in a similar manner on an opposite side of the frame.

Each wing boom may support a series of spraying units (not shown) designed to deliver fluid from tank 24, centrally supported on frame 12, onto a farming or planting surface. As noted above, the tank 24 may be positioned generally in the center of the frame 12 between the left and right wing booms 14 and 16, respectively, and an operator cab 26, which may be part of a body supported by the frame 12. The tank 24 may be designed to contain fluid, such as herbicide, insecticide, and fertilizer, which is fed to the spraying units through a series of fluid lines (not shown) as known in the art. As also known in the art, the operator cab 26 contains a control panel (not shown) that has various operator controls for driving, steering and otherwise controlling operation of the machine 10 and its components.

In accordance with an aspect of the invention, the machine 10 may include a tire inflation control system 30 as illustrated in FIG. 3 by way of example. The tire inflation control system 30 may include a system controller 32. The system controller 32 may be in communication with a tire inflation controller 34 and multiple load sensors 36, such as first, second, third and fourth load sensors 36A, 36B, 36C and 36D, respectively. The system controller 32 may also be in communication with a Human Machine Interface (HMI) 38 in the operator cab 26 for receiving a user input, a speed sensor 40 on the machine 10 for determining a speed of the machine 10, a location sensor 42 for determining a location of the machine 10, such as via a Global Positioning System (GPS), and a database 44 which may be implemented in a non-transient computer readable medium.

In operation, the load sensors 36 may be configured on the machine 10 to sense loads which may corresponding to the inflatable tires 11. For example, the first load sensor 36A may be configured to sense a load which may corresponding to the inflatable tires 11A, the second load sensor 36B may be configured to sense a load which may corresponding to the inflatable tires 11B, and so forth. The system controller 32, which may comprise a processor, microcontroller and/or other programmable logic, may execute a program stored in a non-transient medium to determine a load differential between load sensors 36 corresponding to inflatable tires 11 on opposing locations of the machine 10. The load differential may be caused by a disproportionate distribution of forces and/or weight on the machine 10, such as, for example, by a ladder and walkway apparatus mounted on the left side of the machine 10 and not on the right side of the machine 10; or the left and right wing booms 14 and 16, respectively, mounted on the back of the machine 10 and not on the front of the machine 10; or gravitational and/or other forces experienced by the machine 10, including during a turn and/or on a grade. Accordingly, the system controller 32, in turn, may command the tire inflation controller 34 to inflate or deflate one or more of the inflatable tires 11 according to the load differential to achieve an optimal tire inflation configuration.

For example, in one configuration, the system controller 32 may determine a load differential which indicates a first load sensed by load sensor 36A is greater than a second load sensed by load sensor 36B. Accordingly, the system controller 32, in turn, may command the tire inflation controller 34 to inflate inflatable tire 11A and/or deflate inflatable tire 11B to achieve an optimal tire inflation configuration.

In another aspect, the system controller 32 may receive a user input from an operator in the in the operator cab 26 via the HMI 38. The HMI 38 may be a touchscreen or other device having an interface allowing an operator to view information and/or make selections. Accordingly, the system controller 32 may command the tire inflation controller 34 to inflate or deflate one or more of the inflatable tires 11 according to the user input. For example, a user may provide input via the HMI 38 characterizing soil moisture, such as tending to be wet or tending to be dry. If a user indicates the soil is tending to be wet, the system controller 32 may command the tire inflation controller 34 to gradually deflate one or more of the inflatable tires 11 as desired by the operator. However, if the user indicates the soil is tending to be dry, the system controller 32 may command the tire inflation controller 34 to gradually inflate one or more of the inflatable tires 11 as desired by the operator.

In another aspect, the system controller 32 may receive a speed of the machine 10 from the speed sensor 40. Accordingly, the system controller 32 may command the tire inflation controller 34 to inflate or deflate one or more of the inflatable tires 11 according to the speed. For example, if a speed is determined by the system controller 32 to be decreasing, the system controller 32 may command the tire inflation controller 34 to gradually deflate one or more of the inflatable tires 11. However, if a speed is determined by, the system controller 32 to be increasing, the system controller 32 may command the tire inflation controller 34 to gradually inflate one or more of the inflatable tires 11.

In another aspect, the system controller 32 may receive a location of the machine 10 as determined by the location sensor 42. The system controller 32, in turn, may determine a coordinate location of the machine 10 on a field moisture map in the database 44 and command the tire inflation controller 34 accordingly, including as described in U.S. Pat. No. 7,302,837, titled "Tire Inflation System for Use with an Agricultural Implement," the disclosure of which is incorporated herein by reference in its entirety. For example, if the system controller 32 determines the machine 10 to be in soft, wet or substantially moist location, the system controller 32 may command the tire inflation controller 34 to gradually deflate one or more of the inflatable tires 11. However, if the system controller 32 determines the machine 10 to be in hard or dry location, the system controller 32 may command the tire inflation controller 34 to gradually inflate one or more of the inflatable tires 11.

Figure 4:
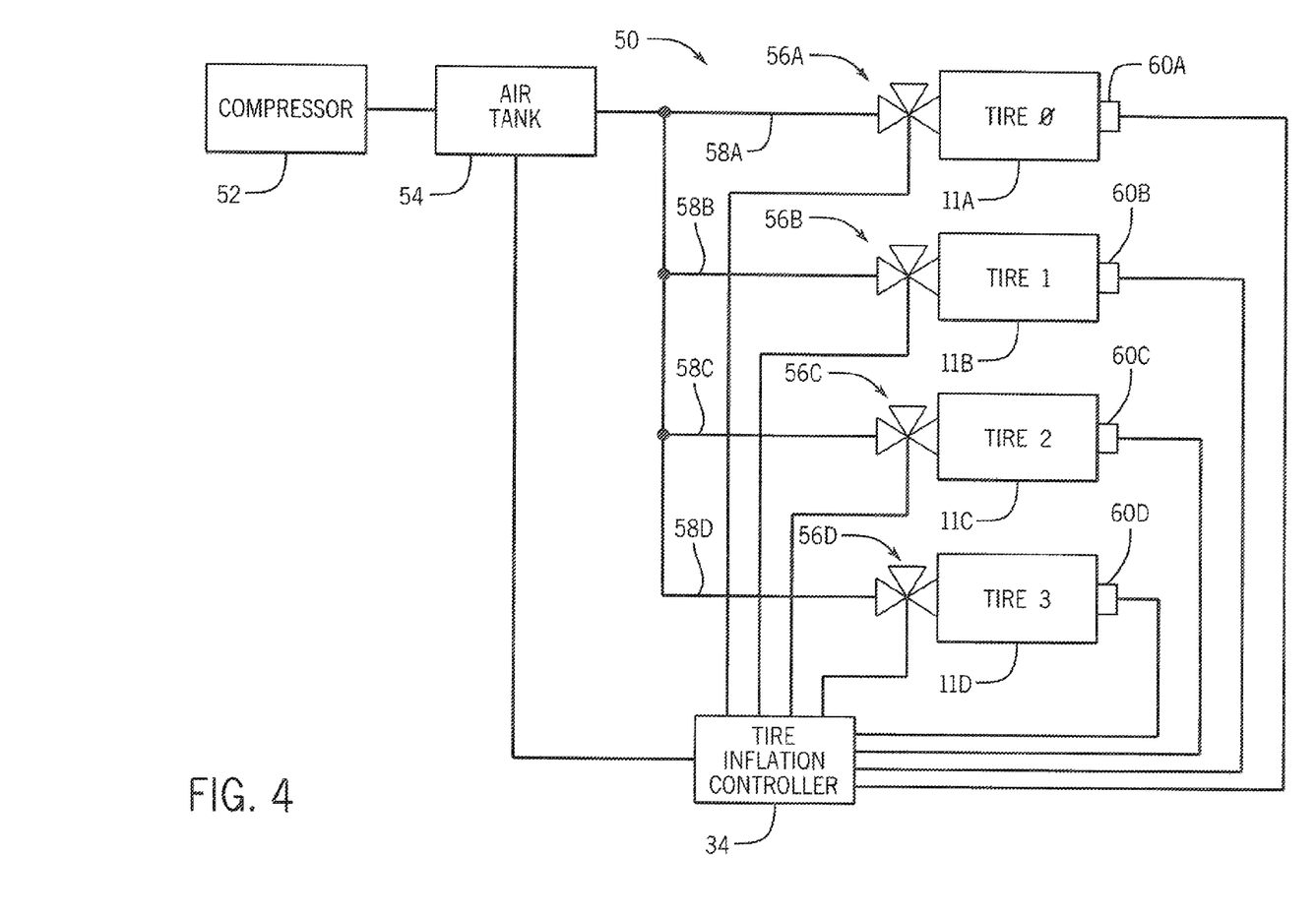
FIG. 4 illustrates a schematic diagram of a system for inflating or deflating tires of the agricultural machine of FIGS. 1 and 2.

Referring now to FIG. 4, a schematic diagram of an exemplar system 50 for inflating or deflating tires of the agricultural machine 10 is provided. In the system 50, an air compressor 52 is configured to draw ambient air for an air tank 54 on the machine 10. The air tank 54, in turn, provides air to three-way valves 56 (shown as first, second, third and fourth valves 56A, 56B, 56C and 56D, respectively) in communication with the inflatable tires 11, via air lines 58 (shown as first, second, third and fourth air lines 58A, 58B, 58C and 58D, respectively). Pressure sensors 60 (shown as first, second, third and fourth pressure sensors 60A, 60B, 60C and 60D, respectively) may be configured to sense pressure corresponding to the inflatable tires 11 and provide pressure measurements to the tire inflation controller 34 for each of the inflatable tires 11 accordingly. Pressure sensors 60 could be, for example, part of a wireless, battery powered Tire Pressure Monitoring System (TPMS) as known in the art.

In operation, the tire inflation controller 34 may receive pressure measurements from the pressure sensors 60 and may report the pressure measurements to the system controller 32. The tire inflation controller 34 may also be commanded to actuate the valves 56, such as by the system controller 32. To inflate one or more of the inflatable tires 11, the tire inflation controller 34 may actuate one or more of the valves 56 to provide air from the air tank 54 to the respective inflatable tire 11. To deflate one or more of the inflatable tires 11, the tire inflation controller 34 may actuate one or more of the valves 56 to release air from the inflatable tire 11 to the outside environment while blocking air from the air tank 54. To maintain pressure in one or more of the inflatable tires 11, the tire inflation controller 34 may actuate one or more of the valves 56 to block air from entering the inflatable tire 11 via the air tank 54 and block air from escaping the inflatable tire 11 to the outside environment.

Figure 5:
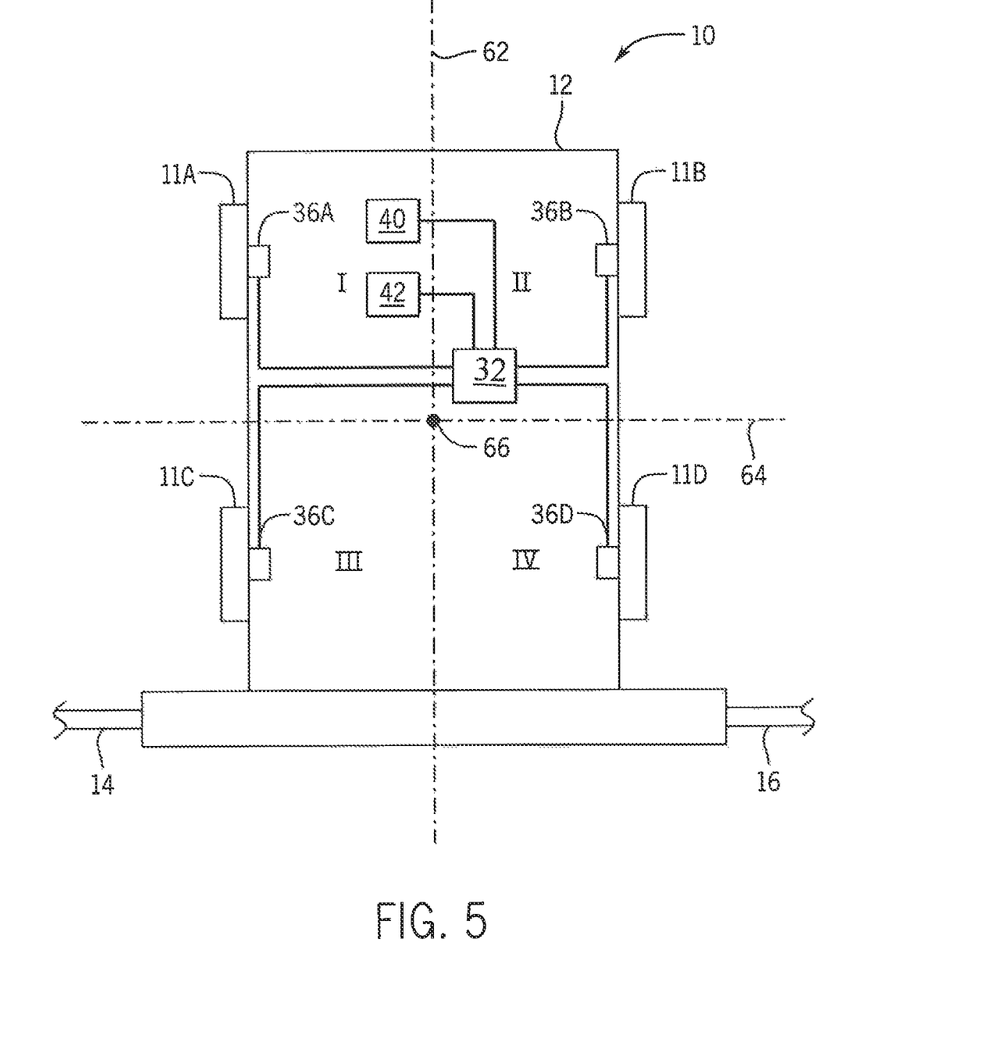
FIG. 5 illustrates a plan view of a sensing diagram of the agricultural machine of FIGS. 1 and 2 having load sensors for determining a load differential.

Referring now to FIG. 5, an exemplar plan view of a sensing diagram of the machine 10 having load sensors 36 for determining a load differential is provided. The load sensors 36 may be configured on the machine 10 to sense loads which may corresponding to respective inflatable tires 11 by being positioned proximal to the inflatable tires 11. Load sensing in relation to inflatable tires 11 is further contemplated in U.S. Patent Application Publication No. 2016/0059643, titled "Tire Pressure Control System for a Vehicle," the disclosure of which is incorporated herein by reference in its entirety. The position of the speed sensor 40 and the location sensor 42 on the machine 10 are less important, so long as measurements may be reliably sensed and reported to the system controller 32.

In an aspect of the invention providing a machine 10 with four inflatable tires 11, the load sensors 36 may be configured to sense loads according to quadrants of the machine 10 separated by a lateral axis 62 and a longitudinal axis 64 of the machine 10. The lateral axis 62 and the longitudinal axis 64 may intersect at an approximate planar center of mass 66 of the machine 10, which center of mass 66 may vary according to a disproportionate distribution of forces and/or weight on the machine 10. The system controller may determine a location of the center of mass 66 in determining a load differential based on loads sensed by the load sensors 36. The system controller 32, in turn, may command the tire inflation controller 34 to inflate or deflate one or more of the inflatable tires 11 according to the center of mass 66 determined in the load differential to achieve an optimal tire inflation configuration.

Depending on the amount and configuration of load sensors 36 used, the load differential may take into account loads, at opposing locations on opposing sides of the machine 10, such as between inflatable tire 11A and inflatable tire 11B, or between inflatable tire 11C and inflatable tire 11D, or may take into account loads at opposing locations on a same side of the machine 10, such as between inflatable tire 11A and inflatable tire 11C, or between inflatable tire 11B and inflatable tire 11D. The load differential may also take into account loads at opposing corners, such as between inflatable tire 11A and inflatable tire 11D, or between inflatable tire 11B and inflatable tire 11C. In a preferred aspect, a load sensor 36 may be used for each inflatable tire 11, though it will be appreciated that a subset of load sensors 36 may be used.

Although the best mode contemplated by the inventors of carrying out the present invention is disclosed above, practice of the above invention is not limited thereto. It will be manifest that various additions, modifications and rearrangements of the features of the present invention may be made without deviating from the spirit and the scope of the underlying inventive concept.

What is claimed is:
1. A self-propelled agricultural machine comprising:
a frame;
an operator cab supported by the frame;

first and second wheels having first and second inflatable tires mounted thereon, respectively, the first and second inflatable tires being configured to support the frame on opposing locations;

a tire inflation controller in communication with the first and second inflatable tires, the tire inflation controller being operable to at least one of inflate and deflate either of the first and second inflatable tires;

first and second load sensors located proximal to the first and second inflatable tires, respectively, the first and second load sensors being configured to sense first and second loads corresponding to the first and second inflatable tires, respectively; and a system controller in communication with the tire inflation controller and the first and second load sensors, the system controller executing a program stored in a non-transient medium operable to:

(a) compare the first load sensed by the first load sensor to the second load sensed by the second load sensor so as to determine a load differential between the first and second loads;

(b) determine a center of mass of the self-propelled agricultural sprayer from the load differential; and (c) command the tire inflation controller to at least one of inflate and deflate either of the first and second inflatable tires according to at least one of the load differential and the center of mass.

2. The self-propelled agricultural machine of claim 1, wherein the load differential indicates the first load is greater than the second load.

3. The self-propelled agricultural machine of claim 2, wherein the system controller commands the tire inflation controller to inflate the first inflatable tire and deflate the second inflatable tire according to the first load being greater than the second load.

4. The self-propelled agricultural machine of claim 1, further comprising a Human Machine Interface (HMI) in the operator cab, wherein the system controller is further operable to command the tire inflation controller to at least one of inflate and deflate either of the first and second inflatable tires according to an input provided by the HMI.

5. The self-propelled agricultural machine of claim 4, wherein the input characterizes soil moisture, and the system controller commands the tire inflation controller to deflate either of the first and second inflatable tires according to an increase of soil moisture.

6. The self-propelled agricultural machine of claim 1, further comprising an air tank, an air compressor, first and second air lines, and first and second valves, wherein the air compressor is configured to provide ambient air to the air tank, and the air tank is configured to provide air to the first and second valves via the first and second air lines, respectively, and wherein the tire inflation controller is operable to at least one of (i) inflate either of the first and second inflatable tires by controlling the first and second valves, respectively, to provide air from the air tank, and (ii) deflate either of the first and second inflatable tires by controlling the first and second valves to release air from the first and second inflatable tires, respectively.

7. The self-propelled agricultural machine of claim 6, further comprising first and second pressure sensors configured to sense a pressure corresponding to the first and second inflatable tires, respectively.

8. The self-propelled agricultural machine of claim 1, further comprising a speed sensor in communication with the system controller, the speed sensor being configured to determine a speed of the self-propelled agricultural machine, wherein the system controller commands the tire inflation controller to inflate at least one of the first and second inflatable tires upon determining an increase in speed.

9. The self-propelled agricultural machine of claim 1, wherein the first and second inflatable tires support the frame on left and right sides of the frame, respectively.

10. The self-propelled agricultural machine of claim 1, wherein the first and second inflatable tires support the frame at a front and a back of the frame, respectively.

11. The self-propelled agricultural machine of claim 10, wherein the first and second inflatable tires are at the front and the back of the frame on a same side of the frame, respectively.

12. A self-propelled agricultural sprayer comprising:

a frame;

an operator cab supported by the frame;

a pair of wing booms pivotably mounted to the frame, the wing booms being configured to spray an agricultural field;

first, second, third and fourth wheels having first, second, third and fourth inflatable tires mounted thereon, respectively, the first and second inflatable tires being configured to support the frame on left and right opposing sides at a front of the frame, respectively, and the third and fourth inflatable tires being configured to support the frame on left and right opposing sides at a back of the frame, respectively;

a tire inflation controller in communication with the first, second, third and fourth inflatable tires, the tire inflation controller being operable to at least one of inflate and deflate any of the first, second, third and fourth inflatable tires;

first, second, third and fourth load sensors located proximal to the first, second, third and fourth inflatable tires, respectively, the first, second, third and fourth load sensors being configured to sense first, second, third and fourth loads corresponding to the first, second, third and fourth inflatable tires, respectively; and a system controller in communication with the tire inflation controller and the first, second, third and fourth load sensors, the system controller executing a program stored in a non-transient medium operable to:

(a) compare one of the first load sensed by the first load sensor, the second load sensed by the second load sensor, the third load sensed by the third load sensor and the fourth load sensed by the fourth load sensor to another one of the first load sensed by the first load sensor, the second load sensed by the second load sensor, the third load sensed by the third load sensor and the fourth load sensed by the fourth load sensor so as to determine a load differential;

(b) determine a center of mass of the self-propelled agricultural sprayer from the load differential; and (c) command the tire inflation controller to at least one of inflate and deflate at least one of the first, second, third and fourth inflatable tires according to at least one of the load differential and the center of mass.

13. The self-propelled agricultural sprayer of claim 12, wherein the load differential indicates at least one of the first load being greater than the second load and the third load being greater than the fourth load.

14. The self-propelled agricultural sprayer of claim 13, wherein the system controller commands the tire inflation controller to at least one of: (i) inflate the first inflatable tire and deflate the second inflatable tire, and (ii) inflate the second inflatable tire and deflate the third inflatable tire.

15. The self-propelled agricultural sprayer of claim 12, wherein the load differential indicates at least one the first load being greater than the third load and the second load being greater than the fourth load.

16. The self-propelled agricultural sprayer of claim 15, wherein the system controller commands the tire inflation controller to at least one of: (i) inflate the first inflatable tire and deflate the third inflatable tire, and (ii) inflate the second inflatable tire and deflate the fourth inflatable tire.

17. The self-propelled agricultural sprayer of claim 12, further comprising a Human Machine Interface (HMI) in the operator cab, wherein the system controller is further operable to command the tire inflation controller to at least one of inflate and deflate either of the first, second, third and fourth inflatable tires according to an input provided by the HMI.

18. The self-propelled agricultural sprayer of claim 17, wherein the input characterizes soil moisture, and the system controller commands the tire inflation controller to deflate either of the first and second inflatable tires according to an increase of soil moisture.

19. The self-propelled agricultural sprayer of claim 12, further comprising an air tank, an air compressor, first, second, third and fourth air lines, and first, second, third and fourth valves, wherein the air compressor is configured to provide ambient air to the air tank, and the air tank is configured to provide air to the first, second, third and fourth valves via the first, second, third and fourth air lines, respectively, and wherein the tire inflation controller is operable to at least one of inflate either of the first, second, third and fourth inflatable tires by controlling the first, second, third and fourth valves, respectively, to provide air from the air tank, and deflate either of the first, second, third and fourth inflatable tires by controlling the first, second, third and fourth valves to release air from the first, second, third and fourth inflatable tires, respectively.

20. The self-propelled agricultural sprayer of claim 12, further comprising a speed sensor in communication with the system controller, the speed sensor being configured to determine a speed of the self-propelled agricultural sprayer, wherein the system controller commands the tire inflation controller to inflate at least one of the first, second, third and fourth inflatable tires upon determining an increase in speed.

* * * * *